United States Patent [19]
Fischer

[11] 3,987,984
[45] Oct. 26, 1976

[54] SEMI-RIGID AIRCRAFT WING

[76] Inventor: Albert George Fischer, Preinstr. 132, 46 Dortmund, Wellinghofen, Germany

[22] Filed: Apr. 9, 1973

[21] Appl. No.: 349,284

[52] U.S. Cl. .................................................. 244/44
[51] Int. Cl.² .......................................... B64C 3/46
[58] Field of Search ................. 244/44, 5, 16, 123, 244/DIG. 1, 49, 43; 416/84, 132, 240

[56] References Cited
UNITED STATES PATENTS

| | | | |
|---|---|---|---|
| 1,905,298 | 4/1933 | McDaniel | 244/123 |
| 2,616,509 | 11/1952 | Thomas | 244/43 X |
| 2,969,207 | 1/1961 | Fain et al. | 244/44 |
| 3,158,338 | 11/1964 | Cushman | 244/44 |
| 3,184,187 | 5/1965 | Isaac | 244/44 X |
| 3,463,420 | 8/1969 | Butler et al. | 244/123 X |
| 3,584,813 | 6/1971 | Sweeney et al. | 244/44 |
| 3,647,163 | 3/1972 | Sweeney | 244/49 |

*Primary Examiner*—Trygve M. Blix
*Assistant Examiner*—Barry L. Kelmachter
*Attorney, Agent, or Firm*—Brown, Murray, Flick & Peckham

[57] ABSTRACT

A semi-rigid aircraft wing is provided of the type having a rigid spar forming the leading edge, a flexible cable forming the trailing edge, and a fabric covering forming upper and lower surfaces. An inflatable air bag is placed within the wing extending from end to end of the wing adjacent the rigid spar to engage at least one of the wing surfaces when inflated to control the airfoil configuration.

7 Claims, 13 Drawing Figures

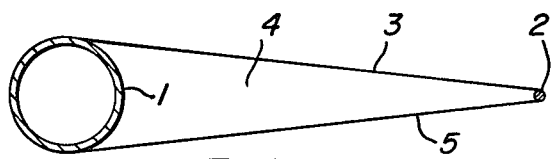
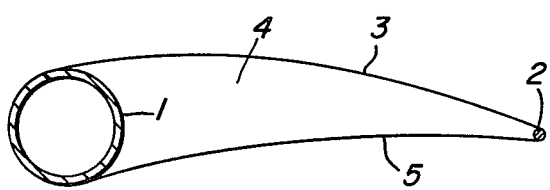
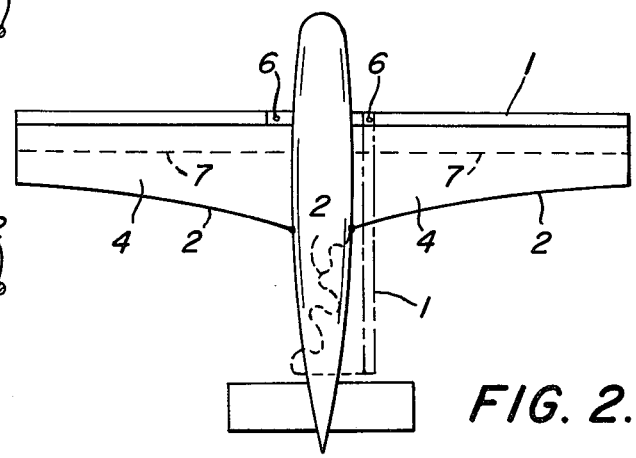
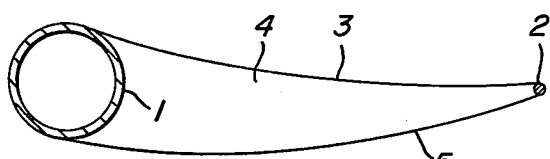
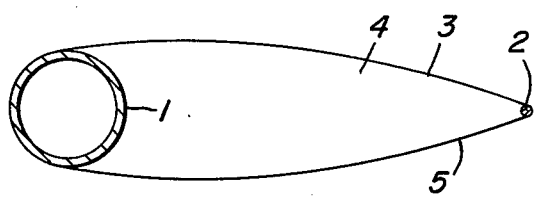
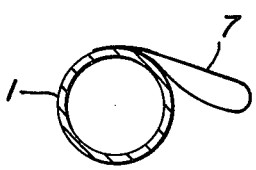
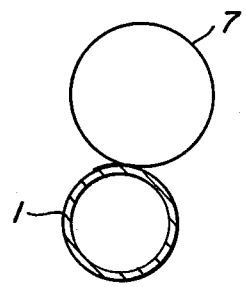
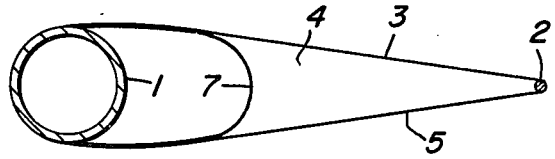
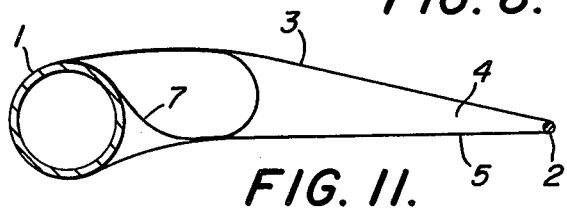
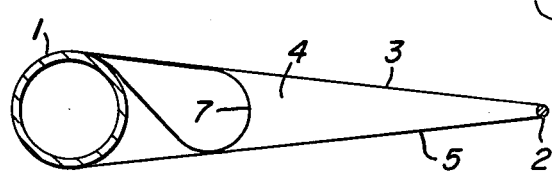
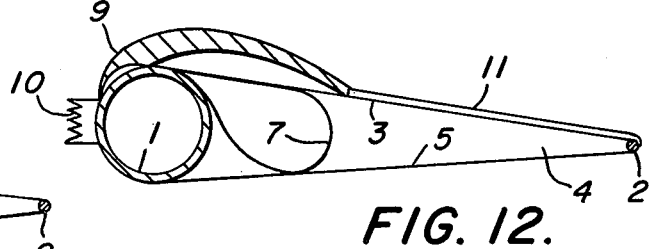
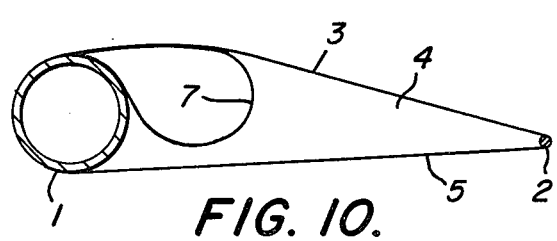
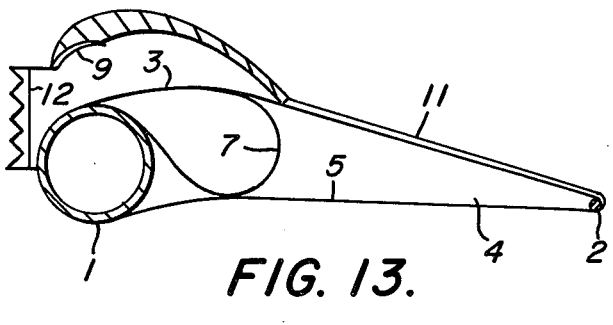

3,987,984

SEMI-RIGID AIRCRAFT WING

BACKGROUND OF THE INVENTION

The Princeton sailwing, developed and researched at Forrestal Research Center in Princeton, N.J., is an aircraft wing of extreme simplicity which consists of a large-diameter round front spar (usually an aluminum tube), a taut flexible rope or cable as the rear spar, and cloth covering both sides. There are no ribs. This principle permits the construction of lightweight wings of high aerodynamic efficiency, with lift/drag ratios as high as 22. It has been suggested to employ these wings for light airplanes, but so far the Princeton sailwing has not yet been widely used because of the severe shortcoming of inherent flutter-instability as explained in the following: If the air stream during flight should strike the Princeton sailwing accidentally from above, not from below as usual, which can occur in a "negative G" maneuver or in a wind gust, the airfoil of the wing can snap into an inverted camber condition where the upper side is concave and the lower side convex. This inverted airfoil produces radical changes in the lift conditions, and dangerous aircraft instability will result.

A general article on the Princeton sailwing, written by Mr. T. Sweeney, can be found in Popular Science, Oct. 1972. In the present invention, this flutter problem is solved, and in addition, the sailwing is made variable in flight, to allow short take-off and landing (STOL) performance, and easy steerability.

SUMMARY OF THE INVENTION

This invention is directed to a light airplane for sport and recreational use employing the basic Princeton sailwing principle for wing construction, however with additional, novel air bags in the wings for removal of the flutter-instability, for giving the aircraft STOL-performance by making the airfoil variable in flight, for allowing easy steerability and for making the airplane wings foldable on the ground to allow convenient trailering behind a car, and storage in the car garage.

The same principles can be used to design foldable, retractable wings for earth-reentry space vehicles, for windmill wings which can be adjusted to high or low wind speeds in an easy way, and for the rotors of light rotorcraft.

BRIEF DESCRIPTION OF THE DRAWINGS

For a better understanding of the invention, reference may be had to the preferred embodiments exemplary of the invention, shown in the accompanying drawing, in which:

FIG. 1 is a cross section or airfoil of the Princeton sailwing,

FIG. 2 is the top view of an airplane using Princeton sailwings,

FIG. 3 is the airfoil of the Princeton sailwing subject to aerodynamical forces as encountered in flight, FIG. 4 is the dreaded "inverted airfoil" condition encountered in flight if the airstream accidentally hits the Princeton sailwing from above instead from below which leads to aircraft instability, FIG. 5 is the airfoil of a wing which is inflated with air using the impervious wing covering as a hull, which results in a near-symmetrical airfoil, FIG. 6 is the airfoil of a wing incorporating an inflated air bag according to this invention which encloses the front spar and extends rearwards only through part of the wing chord, FIG. 7 shows an air bag according to another embodiment of this invention, in the uninflated state, showing only the air bag and the front spar of a wing, FIG. 8 shows the air bag of FIG. 7 in its inflated state, FIG. 9 shows the air bag in its uninflated state in a complete wing, FIG. 10 shows the airfoil of the wing of FIG. 9 in which the air bag is inflated, thus creating an unsymmetrical flat-bottom airfoil, FIG. 11 shows the airfoil of a further embodiment of the invention in which the air bag is affixed not only to the front spar of the wing but also to the fabric of the underside of the wing, leading to an airfoil of hollow camber suitable for very slow flight, FIG. 12 shows the cross section of a wing with stall-preventing slats in their retracted, inactive state, and FIG. 13 shows the cross section of the wing of FIG. 12 where the stall-preventing slats are in their active, extended state.

DETAILED DESCRIPTION OF THE INVENTION

The Princeton sailwing, developed at the Forrestal Research Center of Princeton University, Princeton, N.J., is an aircraft wing which consists of a large-diameter round or oval front spar 1 (see FIG. 1 which shows a cross-section of this wing) which is usually made of aluminum tubing, a flexible rope or metal cable as the rear spar 2, and cloth 3 and 5 covering both sides of this wing 4. This covering is usually made of sail-quality DACRON synthetic fabric which is rip-resistant, elastic and rot-proof. This principle permits the construction of simple, lightweight wings of high aerodynamic efficiency, with lift/drag ratios as high as 22. It has been suggested to use these wings 4 for light airplanes, such as the one illustrated in FIG. 2. It is important and has never been pointed out clearly that these wings 4 can be folded back very easily on the ground, for convenient trailering of the airplane behind a car and for storage in a garage. For this purpose, the front spar 1 is provided with a hinge 6 located where the wing 4 joins the aircraft fuselage.

Under flight conditions, the Princeton sailwing acquires a slightly unsymmetrical airfoil because the upper fabric covering 3 is pulled upwards by the reduced air pressure above the wing 4, and the lower wing covering 5 is pushed upwards by the increased air pressure below the wing 4. This is illustrated in FIG. 3.

So far, the Princeton sailwing concept has not yet been used widely for man-carrying airplanes because of the severe shortcoming of its inherent flutter-instability, as explained in the following:

If the air stream during flight should strike the Princeton sailwing accidentally from above, not below as usual, which can happen in a negative G maneuver or in a wind gust, the airfoil quickly converts into the shape shown in FIG. 4 where the upper side is concave and the lower side convex. This inverted airfoil brings about radical changes in the lift conditions, resulting in dangerous aircraft instability.

According to the present invention, this flutter instability can be removed, and the Princeton sailwing concept improved and thus be made suitable for human transportation, by inflating the wings 4 with air or gas. This can be accomplished in several ways, to be described here from the simplest to the more complex version:

In the simplest version, the fabric covering is made gas-impervious by coating it, for example, with a thin layer of silicone rubber. When the wing is inflated, the airfoil shown in FIG. 5 is attained. This inflated wing is much harder to convert to the flutter-instability condition of FIG. 4. However, this airfoil is not aerodynamically efficient, since its greatest thickness is too far towards the rear spar. It would be more desirable to have an airfoil which has its greatest thickness at one quarter or one third of its chord. This can be achieved as follows:

Instead of inflating the whole wing, one can incorporate an inflated air bag 7 into the wing. This air bag extends all along the wing span, from the wing root to the wing tip. Chordwise, it can extend from the front spar 1, which it encloses, all the way to the rear spar 2. But this would not differ from the case described previously in FIG. 3. The air bag can, however, be designed to extend only through the first third of the wing chord. This configuration is pictured in FIG. 6 and permits the attainment of aerodynamically efficient airfoils by bulging outward the wing-covering fabric only at the head of the airfoil. The airfoils thus generated are symmetrical.

The desirable attainment of high-lift unsymmetrical airfoils, which was not possible heretofore with the basic Princeton sailwing, is possible in the following way:

FIG. 7 shows that the air bag 7 is now affixed only to the upper surface of the front spar tube 1, and extends into the first third of the wing chord, in the deflated state. When inflated, the air bag 7 would attain the configuration of FIG. 8 if the wing were not covered with fabric 3 and 5. However, if the wing is covered with fabric 3 and 5, as shown in FIG. 9, the airbag in its deflated state has no influence, yet in its inflated state it lifts the upper wing surface 3 into a convex condition. This is illustrated in FIG. 10, which shows a desirable flat-bottom unsymmetrical air foil with its concomitant high lift capability. In addition, this highly unsymmetrical airfoil has now no possibility any more to convert to the unstable configuration of FIG. 4, and is thus an improvement above the configuration of FIG. 6.

For slow-flight capability, wings with unsymmetrical and also with hollow-cambered airfoils would be even more desirable. This can be achieved in the following way:

The air bag 7 which is affixed along the upper surface of the round or oval front spar 1 as shown in FIG. 7, is now affixed also to a strip of the fabric 5 of the underside of the wing 4, as shown in FIG. 11. When inflated, the bag 7 now pulls the fabric 5 upward, leading to the desired concave underside of the wing 4.

Thus it it possible for the pilot to change the lift-to-drag ratio of his aircraft during flight, simply by varying the pressure of inflation of the air bags 7. In their low state of inflation, the wings have a slender, near-symmetrical airfoil suitable for rapid flight, as shown in FIG. 9. In their fully inflated state, the wings change into thick, strongly cambered airfoils as shown in FIG. 11, which are suitable for slow flight, either for soaring in a thermal, if a sail plane using such wings is considered, or for takeoff and landing.

These changes in air foil lead also to changes in the circumference of the wing. These changes can be taken up partially by the elasticity of the synthetic fabric 3 and 5 covering the wing, and partially by the forward movement of the taut, flexible rear spar rope or cable 2, which additionally can be stretchable.

In addition to these improvements of the Princeton sailwing, the air-inflated wings according to this invention (FIGS. 10, 11) can also be used for steering the aircraft in a simple way, thus obviating the need for aileron surfaces which have to be moved mechanically. This construction simplification is important for airplanes which are foldable on the ground.

For this purpose, the inflation pressures in the two wings are intentionally made unequal, so that the resulting stronger camber of the more inflated wing over that of the less inflated wing produces an asymmetry of lift, the more inflated wing having more lift than the less iflated wing, resulting in a roll movement of the aircraft.

As still another feature of the present invention, the intentionally in-flight-variable thickness of the wings, can be used, as shown in FIGS. 12 and 13, to actuate stall-preventing slats at very low airspeeds. These slats 9, in their inactive, retracted condition, are in close contact with the front spar 1 where they are held by the traction of the springs 10. If the air bags 7 are now highly inflated, the upper wing surfaces 3 push against the connecting rods 11 which are fastened to the wing fabric 3 and extend all the way to the rear spars 2. The slats 9 therefore move into the extended, active position where they are held by the strings 12 to prevent further excursion. Other configurations than the one illustrated in FIGS. 12 and 13 are possible for actuating stall-preventing slats by utilizing the variable pressure of inflation of the wings.

The air bags 7 can be fabricated from tear-resistant and gas-impervious plastic foil such as Mylar, or of rubber-impregnated fabric such as Nylon. They can be glued together from sheet material by using a self-adhesive latex cement. Strong bonds can be made in this way also to the upper side of the front spar 1, as illustrated in FIGS. 7 to 13, and for bonding the air bags 7 to the underside fabric coverings 5 of the wings, as in FIGS. 11 and 13.

In order to prevent accidental loss of air pressure in one wing only, which would result in a dangerous asymmetry of the aircraft, the air bags 7 in both wings 4 are normally interconnected through a wide air hose (not shown in the drawings) to allow pressure equalization. For steering purposes, this equalization can be temporarily upset by the pneumatic actuator operated by the pilot (not shown in the drawings).

The gas needed to inflate the air bags 7, which is under a pressure less than one pound per square inch even though much higher pressures are possible, can be supplied continuously or intermittently from sources such as pressurized containers, or battery-driven air pumps for example like those used to inflate rafts, or from a compressor driven by the aircraft's engine, or from the exhaust system of this engine, or from bellows operated by the pilot by muscle power, or by combinations of these devices (not shown in the figures).

Whereas the primary application of the present invention is in the construction of light and inexpensive man-carrying aircraft with desirable properties such as low weight, low cost, simplicity, low speed, short take-off and landing capability, in-flight variable flight characteristics which are important for gliders and powered gliders, foldability on the ground for easy trailering and storage, the scope of the present invention (which has been tested with a radio-controlled scale model to prove the soundness and feasibility) goes far beyond these recreational and sport airplanes.

Using this general principle, it is possible to construct foldable and retractable wings for space vehicles to be used for re-entry into the earth atmosphere.

Another possible application is the construction of wind generators with wings that are inflatable or deflatable, to optimize the generator for various wind speeds by changing the wing camber, thus keeping the rotational speed of the rotor constant. It is conceivable that airfoil-variable rotor blades employing the principles of this invention can be fabricated so that light helicopters or autogiros can be built with fixed rotors, the rotor characteristics being varied just by changing their state of inflation.

It is obvious that other modifications and applications can be made, without departing from the scope and spirit of the present invention.

What I claim is:

1. In an aircraft having a fuselage and wings attached thereto, each of said wings comprising a rigid spar forming the leading edge of the wing, a flexible cable forming the trailing edge of the wing, flexible covering means extending between said spar and said cable and forming upper and lower wing surfaces, and an inflatable air bag disposed within the wing between said surfaces, said air bag extending longitudinally of the wing from end to end thereof and being adapted to engage at least one of the surfaces when inflated to cause the wing to assume a desired airfoil configuration, the air bag being disposed adjacent said rigid spar and extending across the wing not more than half the chordwise width of the wing.

2. The combination defined in claim 1 in which the air bag encloses said spar.

3. The combination defined in claim 1 in which the air bag is attached to the upper surface of said spar.

4. The combination defined in claim 3 in which the air bag is also attached to the lower wing surface.

5. The combination of claim 3 in which the air bags of the separate wings are adapted to be inflated to different pressures to control movement of the aircraft.

6. The combination of claim 3 in which the wing has a stall-preventing slat mounted thereon, said slat having a retracted position when the air bag is less than fully inflated and being movable away from the wing to an extended position when the air bag is fully inflated.

7. The combination of claim 6 including spring means biasing said slat to the retracted position, and means for limiting movement of the slat to the extended position.

* * * * *